(12) United States Patent
Matsuda et al.

(10) Patent No.: US 7,070,147 B2
(45) Date of Patent: Jul. 4, 2006

(54) LUBRICATING OIL FILLING STRUCTURE FOR AN ENGINE

(75) Inventors: Minoru Matsuda, Saitama (JP); Daisuke Hayashi, Saitama (JP); Mamoru Mikame, Saitama (JP); Yoji Kitahara, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 267 days.

(21) Appl. No.: 10/310,902

(22) Filed: Dec. 6, 2002

(65) Prior Publication Data

US 2005/0023411 A1 Feb. 3, 2005

(30) Foreign Application Priority Data

Dec. 13, 2001 (JP) ............................. 2001-379371

(51) Int. Cl.
*F02B 75/22* (2006.01)
(52) U.S. Cl. ............................. 244/53 R; 123/196 R; 123/195 R
(58) Field of Classification Search ............. 184/105.1, 184/106; 123/196 R, 195 R; 244/53 R, 244/1 R, 50, 51, 54–61, 99.5, 99.6, 134 F
See application file for complete search history.

(56) References Cited

U.S. PATENT DOCUMENTS

| | | | | |
|---|---|---|---|---|
| 2,125,958 A | * | 8/1938 | Schmeller, Sr. ........ | 123/41.52 |
| 2,494,347 A | * | 1/1950 | Matthews ................ | 16/260 |
| RE24,645 E | * | 5/1959 | Chayne ................... | 123/54.7 |
| 4,199,304 A | * | 4/1980 | Strikis et al. ............ | 417/310 |
| 4,319,546 A | * | 3/1982 | Beden ..................... | 123/19 |
| 4,331,185 A | * | 5/1982 | Rinaldo et al. .......... | 141/95 |
| 5,022,495 A | * | 6/1991 | Lavender ................ | 184/105.1 |
| 5,074,380 A | * | 12/1991 | Bedi et al. ............... | 184/1.5 |
| 5,113,594 A | * | 5/1992 | Ishihara et al. .......... | 33/722 |
| 5,456,295 A | * | 10/1995 | Taylor et al. ............ | 141/5 |
| 5,487,447 A | * | 1/1996 | Martinez Velazquez .. | 184/1.5 |
| 2001/0047907 A1 | * | 12/2001 | Viken ....................... | 184/1.5 |
| 2002/0092494 A1 | * | 7/2002 | Fukuzawa et al. ....... | 123/193.5 |

FOREIGN PATENT DOCUMENTS

JP 2001-193401 A 7/2001

\* cited by examiner

*Primary Examiner*—Michael Carone
*Assistant Examiner*—Stephen A Holzen
(74) *Attorney, Agent, or Firm*—Birch, Stewart, Kolasch & Birch, LLP

(57) ABSTRACT

The lower end of a filler tube is attached to a service hole formed on a cylinder block in a horizontally opposed engine on a rear side of the engine, e.g., on side opposite from which an output shaft projects. The filler tube is provided with an elbow at the lower end thereof, and the elbow is integrally formed with a hole cover. When one end of the elbow is inserted into the service hole and the hole cover is fixed to the cylinder block, the connection of the filler tube and closing of the service hole can be simultaneously accomplished. The filler tube extends upward and a cap is attached on the filler port at the upper end facing toward the vicinity of the lid provided on the cowl 20. The lid 21 is not deformed locally, and forms a curved surface continuing from remaining portion of the cowl 20.

25 Claims, 9 Drawing Sheets

LUBRICATING OIL FILLING STRUCTURE FOR AN ENGINE

CROSS-REFERENCES TO RELATED APPLICATIONS

This nonprovisional application claims priority under 35 U.S.C. § 119(a) on patent application Ser. No. 2001-379371 filed in Japan on Dec. 13, 2001, the entirety of which is herein incorporated by reference.

BACKGROUND OF THE INVENTION

1. Field of the Invention

The present invention relates to a lubricating oil filling structure for an engine, and more particularly to a lubricating oil filling structure suitable for a horizontally opposed engine for an aircraft.

2. Description of the Background Art

FIG. 8 shows a part of a horizontally opposed engine in which a cylinder block 106 is attached with a cylinder head 107 and is further covered by a cylinder head cover 108, a filler tube 111 having one end attached on the upper surface of the cylinder head cover 108 and the other end extending upward. FIG. 9 shows another horizontally opposed engine, in which a service hole 122 for inserting a piston pin 129 for connecting a piston 127 and a connecting rod (not shown) is formed on the side surface of the cylinder block 106, and is adapted to be closed by attaching a hole cover 113 by a bolt 114 thereon after connection. The engine provided with a similar service hole is disclosed, for example, in JP-A-2001-193401, the entirety of which is hereby incorporated by reference.

When the filler tube 111 is mounted as in the background art shown in FIG. 8, it is necessary to form a special mounting hole on the cylinder head cover 108 and fix the filler tube 111 on the cylinder head cover 108 with a clamping ring 140 attached at the end of the filler tube 111. In addition, in the case of the horizontally opposed engine shown in FIG. 9, the service hole 122 has to be covered by the hole cover 113. Therefore, the number of required man-hours and the number of components undesirably increase with the arrangements of the background art.

When the filler tube 111 is mounted on the cylinder head cover 108 as in the background art of FIG. 8, e.g., in the case of the horizontally opposed engine, the filler tube 111 is positioned at the distal end in the widthwise direction (widthwise direction when it is mounted on the vehicle body or on the air frame and the like) as shown by a phantom line in FIG. 2. Therefore, as shown by the phantom line in FIG. 2, the upper end interferes with the cowl for covering the engine in the arrangements of the background art. In order to avoid such interference, it is necessary to bend the filler tube significantly or to locally deform the cowl to make a projection.

If the engine is intended to be mounted on an aircraft in which improvement of aerodynamic properties is required, the cowl is required to cover around the engine with a smooth and continuous curved surface, while simultaneously avoiding local deformation of the cowl. Since there exist components of an induction system in the vicinity of the cylinder head even when the filler tube is bent, there are many restrictions in disposing the filler tube at a position where interference with those components may be avoided and good operability may be achieved. In addition, when the filler tube is disposed in the vicinity of the output shaft, the filler tube must be positioned away from moving or rotating parts such as the propeller. Accordingly, various layouts for parts and equipment may be necessary.

SUMMARY OF THE INVENTION

The present invention overcomes the shortcomings associated with the background art and achieves other advantages not realized by the background art.

An object of the present invention is to provide structure that permits flexibility in the layout of parts and equipment surrounding a lubricating oil filler structure for an engine.

An object of the present invention is to provide a lubricating oil filler structure for an engine that solves one or more problems of the background art.

One or more of these and other objects are accomplished by an engine comprising a cylinder block; at least one cylinder; at least one slidable piston within the cylinder and at least one piston pin for connecting the piston to a connecting rod; a filler tube for filling lubricating oil, the filler tube having a first end attached on a side surface of the cylinder block and an other end extending outwardly away from the engine; a service hole being formed on the side surface of the cylinder block, the service hole permitting the insertion of the piston pin for connecting the piston and the connecting rod; and a hole cover for covering the service hole being integrally provided with the first end of the filler tube, wherein the first end of the filler tube is inserted into the service hole, the service hole being covered by fixing the hole cover to the side portion of the cylinder block.

One or more of these and other objects are further accomplished by an aircraft having a cowl and an engine, the engine comprising a cylinder block; at least one cylinder; at least one slidable piston within the cylinder and at least one piston pin for connecting the piston to a connecting rod; a filler tube for filling lubricating oil, the filler tube having a first end attached on a side surface of the cylinder block and an other end extending outwardly away from the engine; a service hole being formed on the side surface of the cylinder block, the service hole permitting the insertion of the piston pin for connecting the piston and the connecting rod; and a hole cover for covering the service hole being integrally provided with the first end of the filler tube, wherein the first end of the filler tube is inserted into the service hole, the service hole being covered by fixing the hole cover to the side portion of the cylinder block.

Since the filler tube is provided with the use of the service hole, it is not necessary to provide an opening for mounting the filler tube on the cylinder block. In addition, since the hole cover of the service hole is formed integrally with the filler tube, the filler tube is secured while also closing the service hole by inserting the filler tube into the service hole and fixing the hole cover on the cylinder block. Accordingly, the number of man-hours associated with manufacture, installation, maintenance and repair and the number of required components may be effectively reduced with the present invention.

Since the filler tube is attached on the side opposite from the output shaft and is extended upward therefrom, the filler tube may be isolated from moving or rotating parts such as the output shaft or propeller. In addition, since the mounting position of the filler tube is located on the side surface of the cylinder block, the filler tube is attached on the widthwise center of the engine, whereby it can be extended upwardly therefrom and thus a cowl for covering the engine can be mounted without incurring local deformation.

The filler tube may be attached with a service hole that is formed on the horizontally opposed engine. Furthermore, since the mounting position of the filler tube is located at the center of the horizontally opposed engine, wherein the engine is wider than it is long, and is located behind the cylinder block where interference with components of the induction system disposed in the vicinity of the cylinder head, restrictions in layout may be reduced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not limitative of the present invention, and wherein:

FIG. 6(*b*) is a side view of a filler tube according to an embodiment of the present invention;

DETAILED DESCRIPTION OF THE PREFERRED EMBODIMENTS

Figure 1:
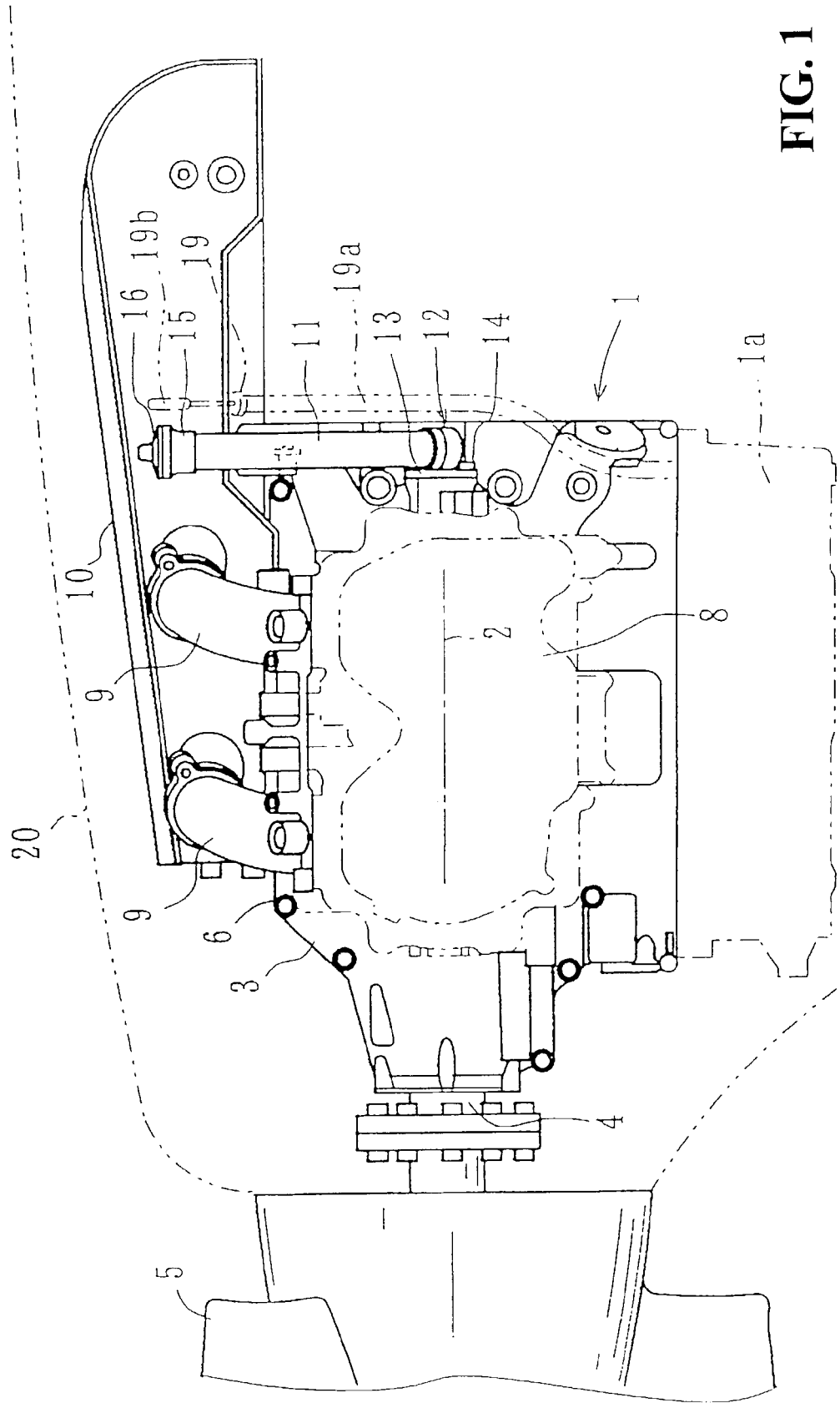
FIG. 1 is a side view of a horizontally opposed engine for an aircraft according to an embodiment of the present invention.
Figure 2:
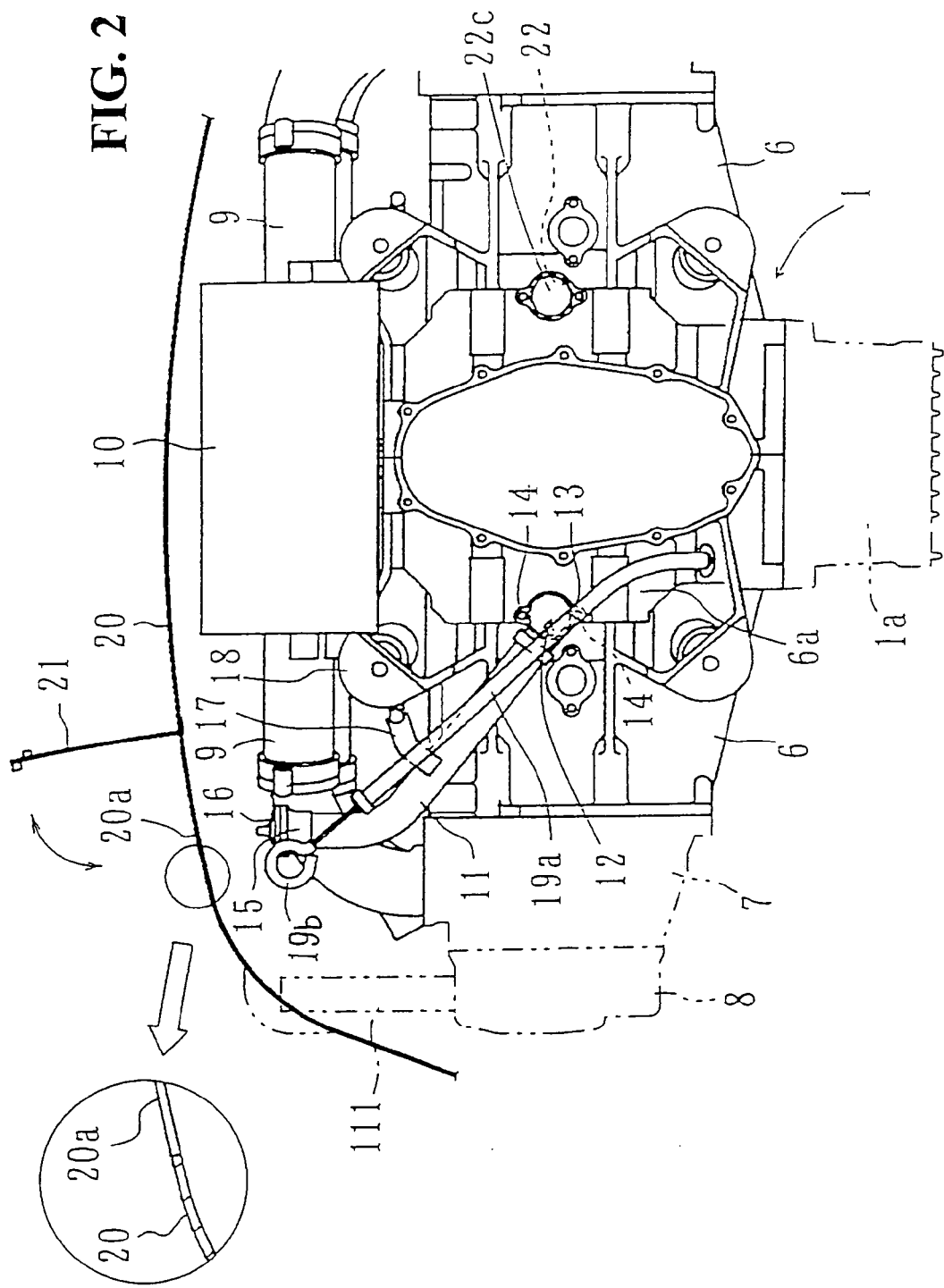
FIG. 2 is a rear view of the engine shown in FIG. 1.
Figure 3:
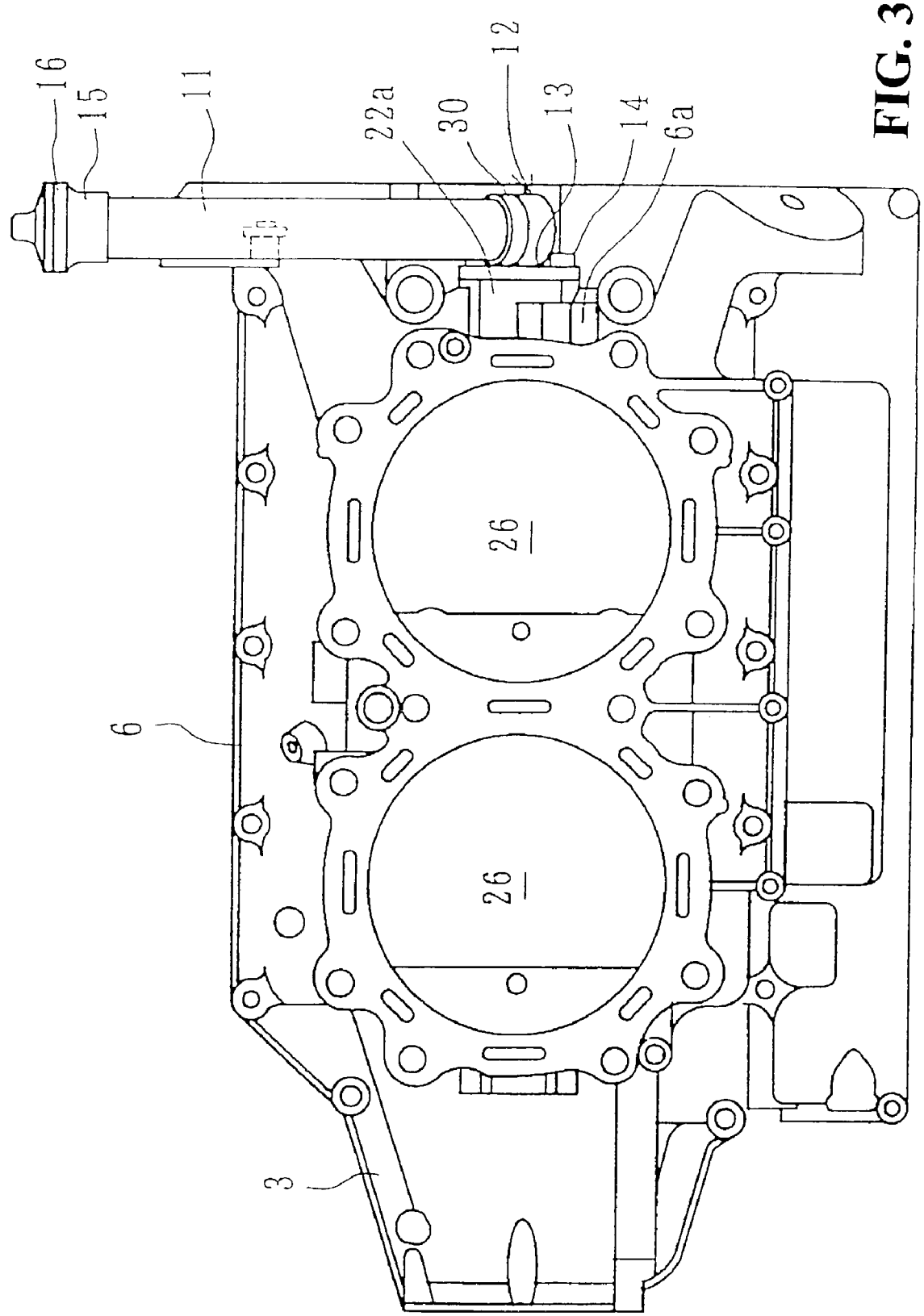
FIG. 3 shows a cylinder block of the horizontally opposed engine when viewed in the same direction as FIG. 1.
Figure 4:
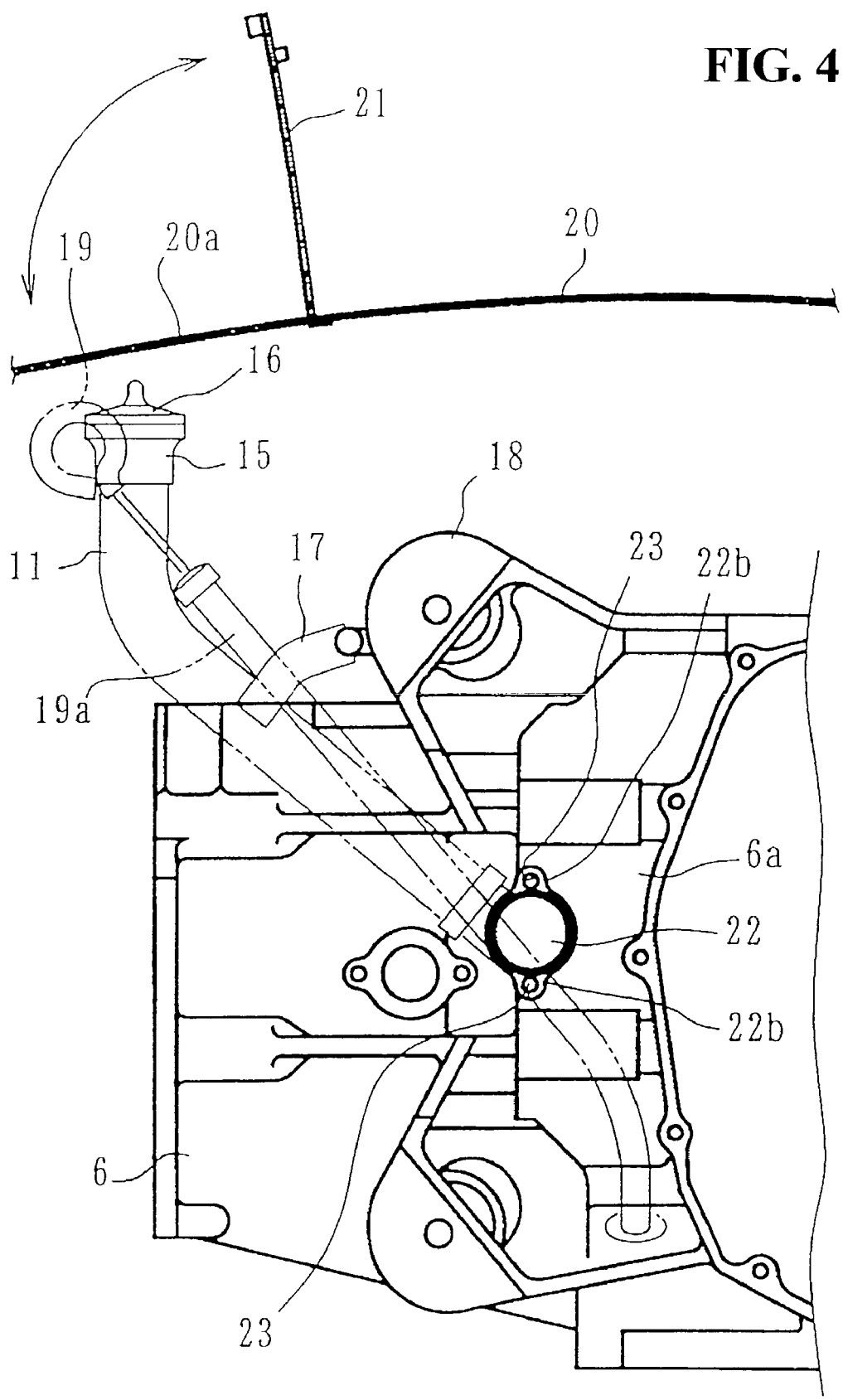
FIG. 4 is the cylinder block of the engine viewed in the same direction as FIG. 2.
Figure 5:
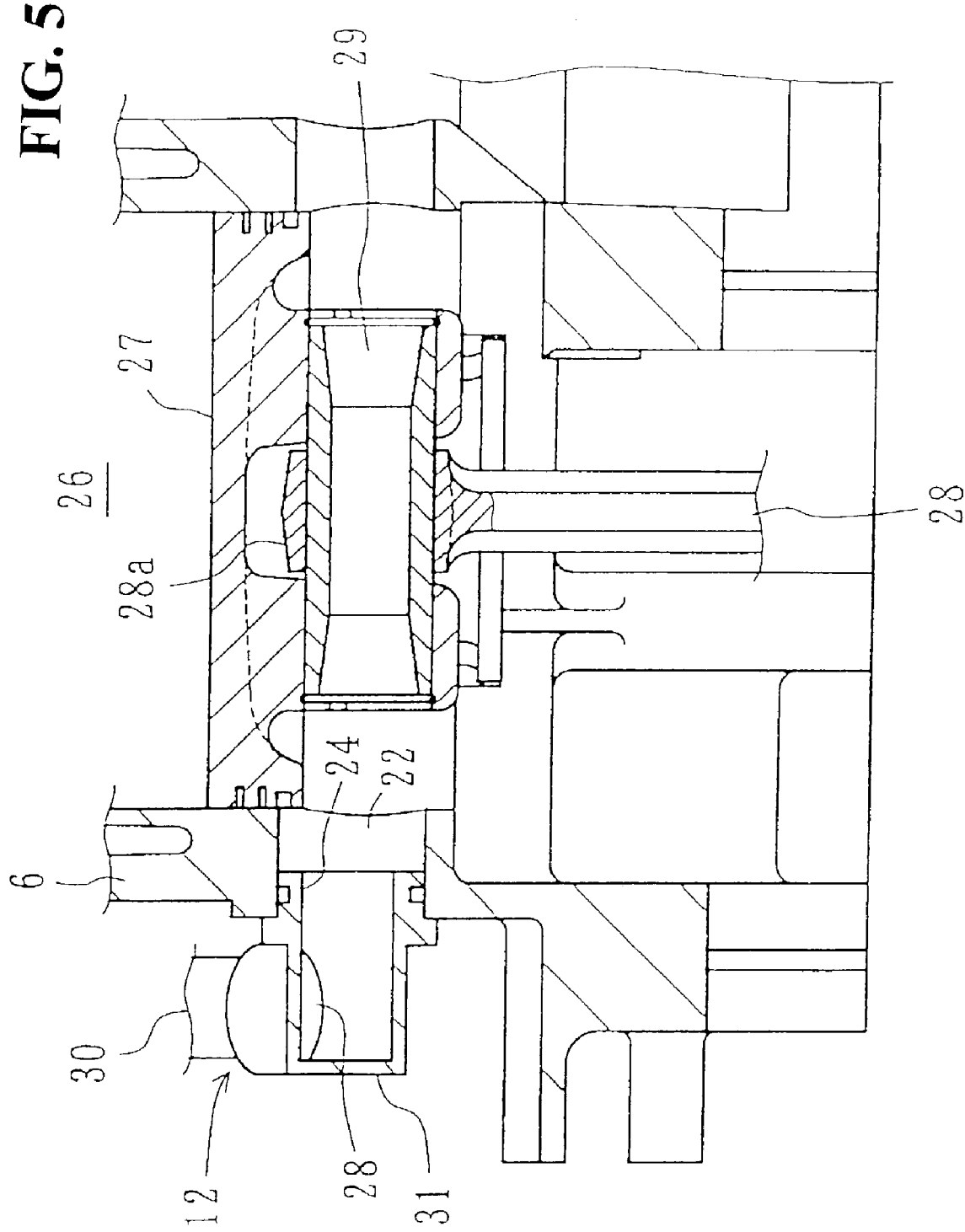
FIG. 5 is a cross sectional view of a portion of the engine.

The present invention will hereinafter be described with reference to the accompanying drawings. FIG. 1 is a side view of a horizontally opposed engine for an aircraft according to an embodiment of the present invention. FIG. 2 is a rear view of the engine shown in FIG. 1. FIG. 3 shows a cylinder block of the horizontally opposed engine when viewed in the same direction as FIG. 1. FIG. 4 is the cylinder block of the engine viewed in the same direction as FIG. 2. FIG. 5 is a cross sectional view of a portion of the engine. FIG. 6 is a view of a filler tube according to an embodiment of the present invention. FIG. 7 is a view of a lid according to an embodiment of the present invention.

In FIG. 1 and FIG. 2, a horizontally opposed engine 1 is a four-cylinder, water-cooled, engine having a crankshaft 2 oriented longitudinally, e.g. in the fore-and-aft direction, as schematically shown with respect to an axis of rotation. A propeller 5 is mounted on an output shaft 4 projected forwardly from the front end of a shaft case 3. A set of a cylinder block 6, a cylinder head 7, and a head cover 8 connected with each other in this order is mounted on the left side and on the right side of the crankcase 3, respectively. One end of an intake pipe 9 is connected to each cylinder through the upper surface of the cylinder head 7 and the other end thereof is connected to an intake manifold 10 supported on the upper center of the engine.

The left and right cylinder blocks 6 are joined at the center in the widthwise direction (the lateral direction in FIG. 2) and opposing each other. An elbow portion 12 of a filler tube 11 is attached on the rear side of the left cylinder block 6 via a built-in hole cover 13 with a bolt 14 in this embodiment. The filler tube 11 extends substantially vertically upward when viewed from the side as shown in FIG. 1, and extends upward at angles, e.g., extending obliquely outward once, bending at the midsection, and then extending substantially vertically upward when viewed from the rear side (as shown in FIG. 2). A filling port 15 opening upward is provided at the upper end thereof. The filling port 15 is adapted to be opened and closed by a cap 16. The midsection of the filler tube 11 is attached and supported on a projection 18 extending from the crankcase 3 by a stay 17. An oil level gauge 19 is inserted into a oil level guide tube 19*a* extending from an oil pan 1*a* disposed below a service hole 22 obliquely upward toward a rear surface 6*a* of the cylinder block 6 so as to be superimposed thereon (FIG. 2) when viewed from the rear. A grip 19*b* at one end thereof is positioned in the vicinity of the filling port 15 of the filler tube 11. The oil level guide tube 19*a* is disposed so as to be superimposed on the filler tube 11 when viewed from the backside.

The circumference of the horizontally opposed engine 1 is covered by the cowl 20, and the surface of the cowl 20 is formed of a smooth continuous curved surface as a whole so as to achieve preferable aerodynamic properties. A maintenance hole 20*a* is formed on the upper surface of the cowl 20 at a position near the grip 19*b* of the oil level gauge 19 and the cap 16 of the filler tube 11. The maintenance hole 20*a* is adapted to be opened and closed by a lid 21. When the lid 21 is opened, the cap 16 and the grip 19*b* are exposed through the same maintenance hole 20*a*, which enables lubrication through the filling port 15 of the filler tube 11 and the oil level to be checked by inserting and pulling out the oil level gauge 19. In FIG. 7 the lid 21 is also shown with a grip and lock 21*a*, and a hinge 21*b*. The surface of the lid 21 forms a curved surface continuous with the cowl 20 when it is closed.

The lower end of the filler tube 11 is secured or fixed on the rear side of the cylinder block 6, and the upper portion thereof is bent slightly outward and extends upward so that the upper end is positioned just below the lid 21 provided on the cowl 20 near the position above the center of the engine. The position where the lid 21 is provided is a curved portion of the cowl 20 having a relatively large curvature that is close to a flat surface, and having a sufficient clearance with respect to the cap 16. In addition, the lid is located at a position where the opening of the lid 21 and filling lubricating oil through the filling port 15 at the upper end of the filler tube 11 may be performed easily, and the filler tube 11 can be made as short as possible.

As shown in FIGS. 3 to 5, a service hole 22 is formed on the rear side 6*a* of the cylinder block 6. The service hole 22 is an opening communicating with the interior of the cylinder block 6. The seating surface 22*b* of a seat 22*a* (FIG. 3) at the service hole 22 is formed with a bolt insertion hole 23 (FIG. 4). As shown in FIG. 2, an extra service hole 22 is also formed on the rear side 6*a* of the cylinder block 6 on the right side of the figure, but the filler tube 11 is not connected thereto, and thus it is covered by a respective hole cover 22*c*.

As is shown in FIG. 5, the service hole 22 is fitted with a cylindrical slip-on portion 24 formed integrally with the elbow portion 12 and projecting from the hole cover 13. The service hole 22 is then sealed with an annular seal 25 surrounding the service hole. The bolt 14 is closely superimposed on the service hole 22 of the lid 21. The cowl 20 is adapted in such a manner that a piston pin 29 for connecting a piston 27 sliding in a cylinder bore 26 and a smaller end 28a of a connecting rod 28 may be inserted from the outside.

As shown in FIG. 5 and FIG. 6, the elbow portion 12 is bent to approximately 90 degrees, and integrally formed by joining a joint portion 30 to be connected to the filler tube 11 and a bottom cylindrical portion 31 located on the extension of the slip-on portion 24. The bottom cylindrical portion 31 is formed with the slip-on portion 24 at the opened end and with the hole cover 13 formed integrally surrounding the slip-on portion 24. The other end of the bottomed cylindrical portion 31 is closed, and the joint portion 30 is connected to the side surface thereof so as to communicate with each other through an opening 32.

Figure 6A:
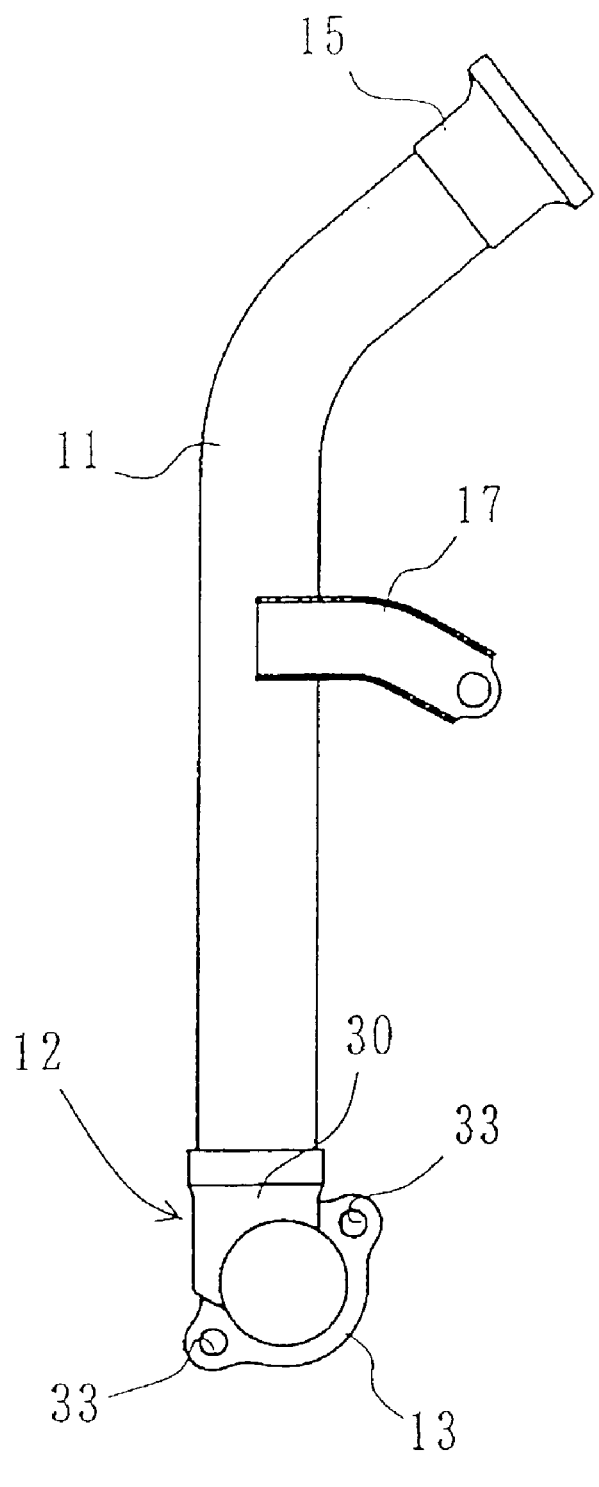
FIG. 6(*a*) is a side view of a filler tube according to an embodiment of the present invention.

As shown in FIG. 6(a), the hole cover 13 is formed substantially into a diamond shape, and is formed with through holes 33 on the opposite corners, and superimposed on the seating surface 22b (FIG. 4) so that the through holes 33 coincide with the bolt mounting holes 23 on the seating surface 22b (FIG. 4). A seal groove 34 (FIG. 6B) is formed around the slip-on portion 24. The elbow portion 12 is formed of suitable synthetic resin, case metal, or the like, and the filler tube 11 is also formed of suitable synthetic resin, rubber, metal, or the like which is superior in oil resistance, heat resistance, and the like. The filling port 15 may also be constructed of the same materials in a preferred embodiment.

Figure 6B:
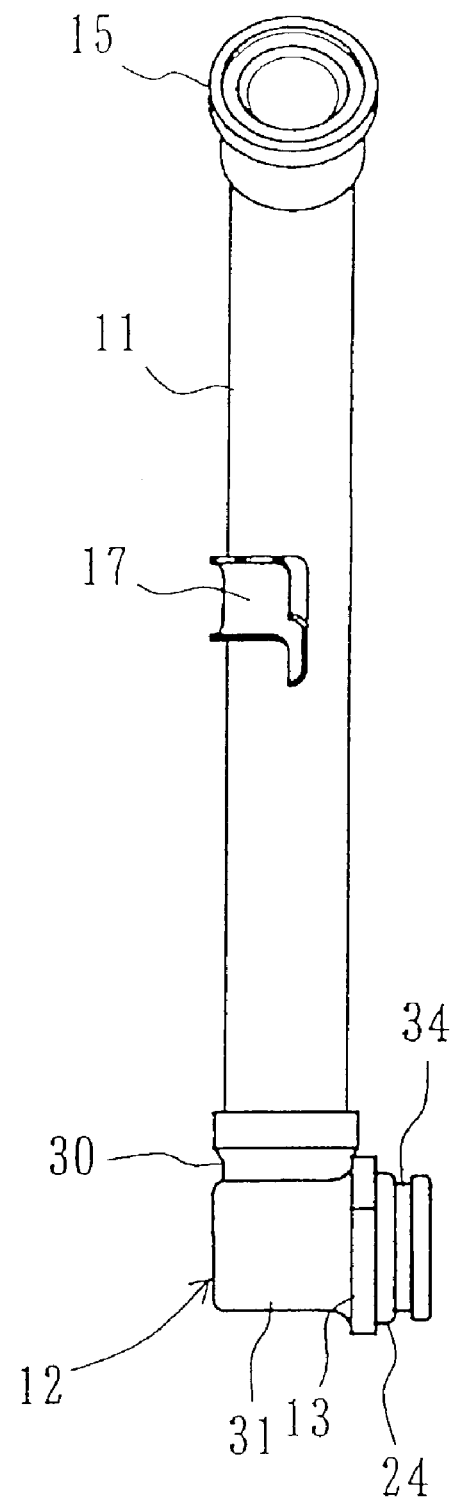
Figure 7:
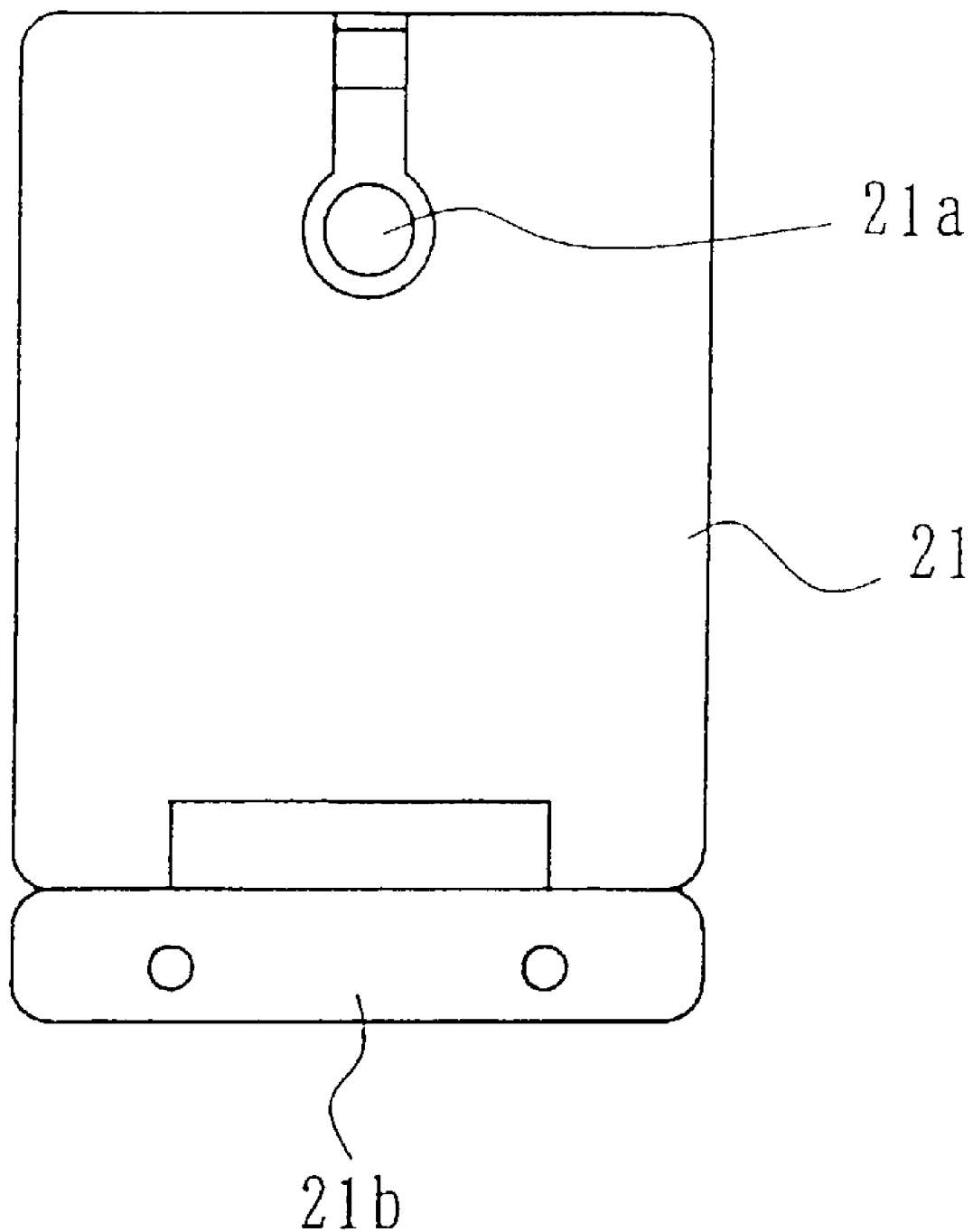
FIG. 7 is a view of a lid according to an embodiment of the present invention.

FIG. 6(a) shows the filler tube 11 seen in the same direction as in FIG. 2, and FIG. 6(b) is a view seen from an angle of about 90 degrees with respect to the view shown in FIG. 6(a), and from the opposite side of the view in FIG. 1. FIGS. 1 and 2 show an oil pan 35 and FIG. 5 also shows a water jacket 36.

The operation of the present embodiment will be described in greater detail hereinafter. In order to mount the filler tube 11 on the horizontally opposed engine 1, the piston 27 and the connecting rod 28 are connected through the service hole 22, then the slip-on portion 24 of the elbow portion 12 mounted at one end of the filler tube 11 is fitted into the service hole 22. Then the built-in hole cover 13 is superimposed on the seating surface 22b so that the through holes 33 and the bolt mounting holes 23 coincide, and then mounted on the cylinder block 6 by the bolt 14. The stay 17 built into the mid-section of the filler tube 11 is then attached on the projection 18 by a bolt or the like.

Accordingly, the lower end of the filler tube 11 is easily attached on the rear side of the cylinder block 6, and the filling port 15 of the upper end of the filler tube 11 is located in the vicinity of the portion of the cowl 20 near the upper center of the engine. The opening of the lid 21, removal of the cap 16, and the filling of the lubricating oil through the filling port 15 can be accomplished more easily. In addition, the filler tube 11 may be made as short as possible.

According to the present embodiment, since the filler tube 11 is provided with the use of the service hole 22, it is not necessary to provide an opening for mounting the filler tube on the cylinder block 6. In addition, since the hole cover 13 of the service hole 22 is formed integrally with the filler tube 11, the attachment of the filler tube 11 and closing of the service hole 22 are simultaneously achieved simply by inserting the filler tube 11 into the service hole 22 and fixing the hole cover 13 on the cylinder block 6. Accordingly, the number of required man-hours for maintenance, repair and manufacture, and the number of required components may be effectively reduced.

In addition, since the filler tube 11 is attached on the side opposite from the output shaft 4 and is extended upward therefrom, it can be isolated from the rotating or moving parts such as the output shaft 16. In addition, since the mounting position of the filler tube 11 is located on the side surface of the cylinder block 6, the filler tube 11 is attached on the widthwise center of the engine. The filler tube 11 can be extended upwardly therefrom and the cowl 20 for covering over the engine can be mounted without incurring any changes in the shape or profile of the cowl 20. Therefore, the curved surface of the cowl 20 may be formed into a smooth continuous curved surface, and required aerodynamic properties can be maintained.

Figure 8:
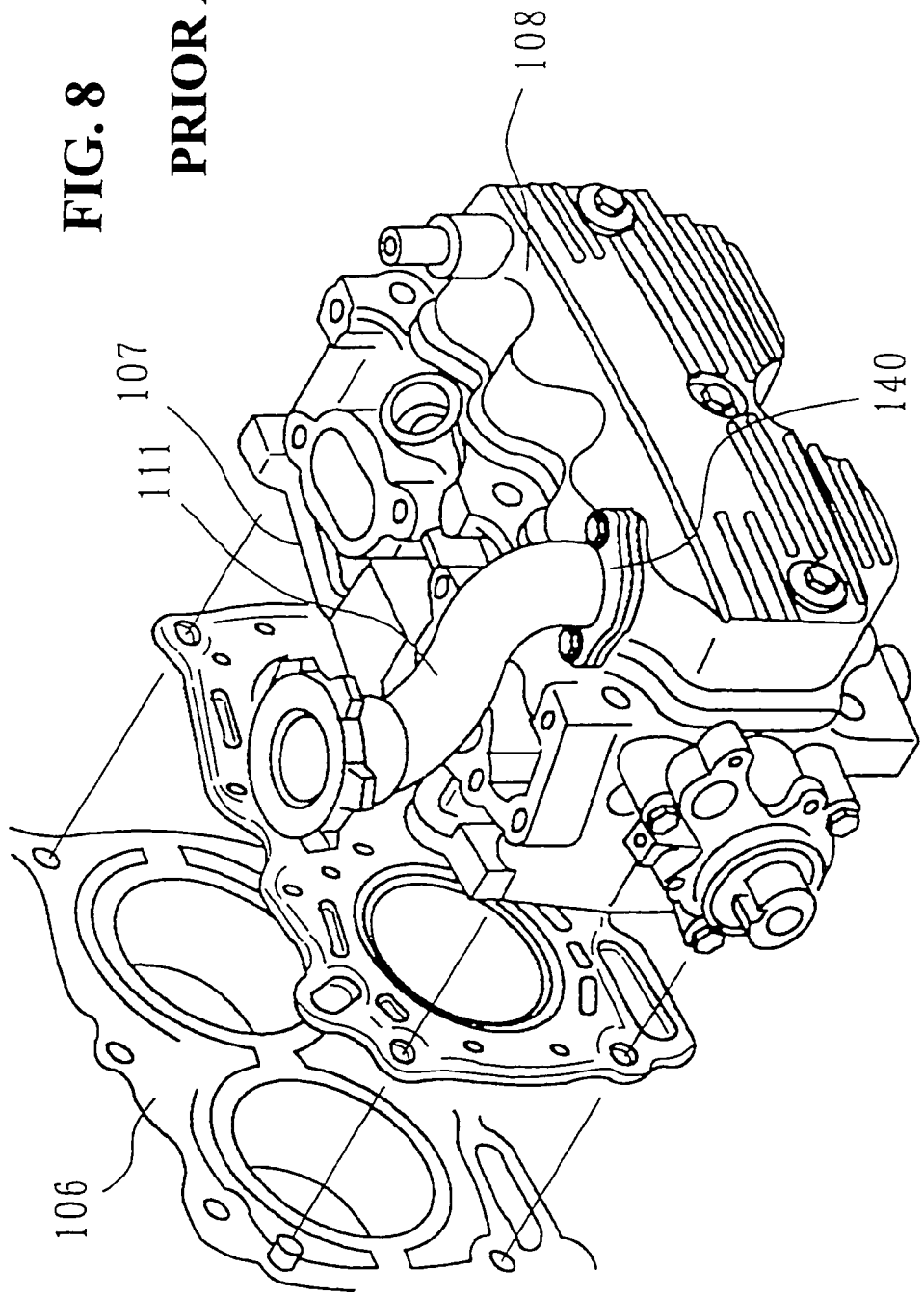
FIG. 8 is a perspective view of a portion a horizontally opposed engine of the background art.
Figure 9:
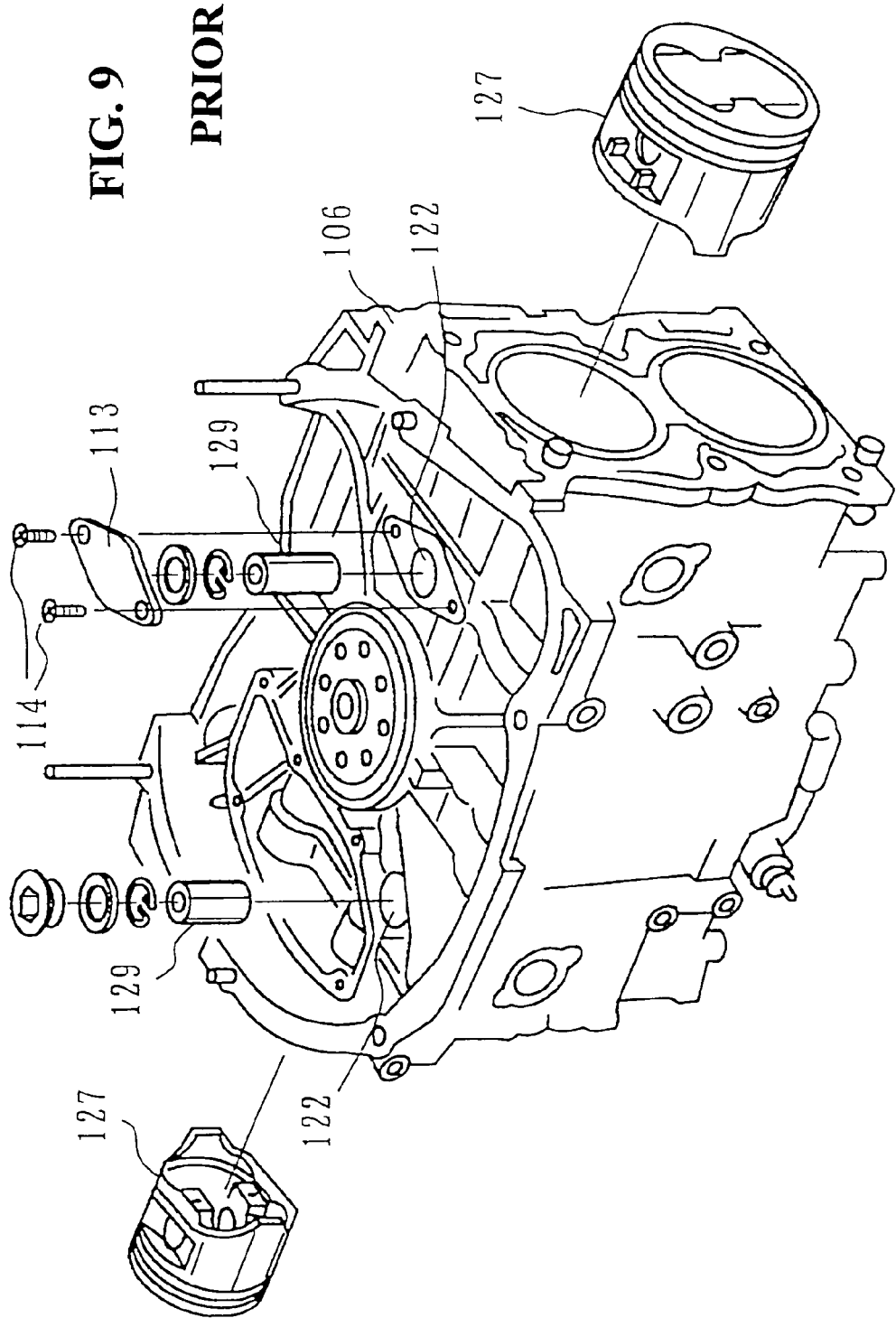
FIG. 9 is a perspective view showing a portion of another horizontally opposed engine according to the background art.

Therefore, the layout of the filler tube 11 can be made easily while maintaining superior aerodynamic properties. Since the oil level guide tube 19a that has to be extended from the oil pan 1a positioned downwardly of the service hole 22 can be disposed in the vicinity of the filler tube 11, the grip 19b at one end of the oil level gauge 19 and the filling port 15 of the filler tube 11 can be positioned closer with respect to each other. Accordingly, the filler tube 11 and the oil level gauge 19 permit utilization of the same maintenance hole 20a. In addition, since it is not necessary to bend or elongate the oil level guide tube 19a or the filler tube 11 for common utilization of the same maintenance hole 20a, the oil level gauge 19 is easily insertable into the provided space and the lubricating properties of the oil are improved. As shown in FIG. 8, in a mode having the filler tube 11 extending from the cylinder head cover in the background art, the oil level guide tube and the filler tube are disposed away from each other, and thus common utilization of the maintenance hole is difficult. In order to realize this, it is required to bend or to elongate one of them significantly.

Since the engine is a horizontally opposed engine, the filler tube 11 may be mounted by utilizing the service hole 22 that is often formed on the engine of this type. Furthermore, since the mounting position of the filler tube 11 is located at the center of the horizontally opposed engine, and is located on the rear side 6a of the cylinder block 6 where interference with the intake pipe 9 disposed in the vicinity of the cylinder head 7 is prevented, restrictions in layout may be reduced and therefore the accomplishment of the layout may be eased. Since the engine may be mounted on the aircraft in a preferred embodiment, the filler tube 11 and the propeller 5 may be disposed sufficiently away from each other, and aerodynamic properties required for the cowl 20 in the aircraft are maintained.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims. For example, the present invention is not limited to the specific engine type of the preferred embodiment, such as an engine for an aircraft or a horizontally opposed engine, but it may be applied to engines for various types of vehicles.

What is claimed is:

1. An engine comprising:
   a cylinder block;
   at least one cylinder;

at least one slidable piston within said cylinder and at least one piston pin for connecting the piston to a connecting rod;

a filler tube for filling lubricating oil, said filler tube having a first end attached on a side surface of the cylinder block and an other end extending outwardly away from the engine, wherein said first end includes an elbow portion;

a service hole being formed on the side surface of the cylinder block, said service hole permitting the insertion of the piston pin for connecting the piston and the connecting rod; and a hole cover for covering said service hole being integrally provided with the first end of said filler tube, wherein the first end of said filler tube is inserted into said service hole, said service hole being covered by fixing said hole cover to the side surface of the cylinder block, wherein the hole cover extends laterally from said elbow portion and in a position surrounding said service hole.

2. The engine according to claim 1, said engine furthering comprising an output shaft, wherein said filler tube is attached on the side surface of the cylinder block opposite from the output shaft, said filler tube extending upward from the side surface of said cylinder block.

3. The engine according to claim 1, wherein said engine is a horizontally opposed engine.

4. The engine according to claim 2, wherein said hole cover includes a slip on portion operatively engaged with an inner diameter of the service hole.

5. The engine according to claim 2, further comprising an oil level gauge having a grip.

6. The engine according to claim 1, further comprising a cap for the other end of the filler tube.

7. The engine according to claim 4, further comprising an oil level gauge having a grip.

8. The engine according to claim 7, further comprising a cap for the other end of the filler tube.

9. The engine according to claim 2, wherein the filler tube extends substantially vertically and obliquely upward with respect to said cylinder block, said filler tube including an oblique section, a midsection, and an upper section including an oil filling port.

10. The engine according to claim 8, wherein the filler tube extends substantially vertically and obliquely upward with respect to said cylinder block, said filler tube including an oblique section, a midsection, and an upper section including an oil filling port.

11. The engine according to claim 9, said filler tube including a stay built into the mid-section of the filler tube and attached on a projection extending from said cylinder block.

12. An aircraft having a cowl and an engine, said engine comprising:

a cylinder block;

at least one cylinder;

at least one slidable piston within said cylinder and at least one piston pin for connecting the piston to a connecting rod;

a filler tube for filling lubricating oil, said filler tube having a first end attached on a side surface of the cylinder block and an other end extending outwardly away from the engine, wherein said first end includes an elbow portion;

a service hole being formed on the side surface of the cylinder block, said service hole permitting the insertion of the piston pin for connecting the piston and the connecting rod; and a hole cover for covering said service hole being integrally provided with the first end of said filler tube, wherein the first end of said filler tube is inserted into said service hole, said service hole being covered by fixing said hole cover to the side surface of the cylinder block, wherein the hole cover extends laterally from said elbow portion and in a position surrounding said service hole.

13. The aircraft according to claim 12, wherein a circumference of the engine is covered by the cowl, and a surface of the cowl is formed of a smooth continuous curved surface.

14. The aircraft according to claim 13, further comprising a maintenance hole being formed on an upper surface of the cowl.

15. The aircraft according to claim 14, further comprising an oil level gauge having a grip.

16. The aircraft according to claim 12, further comprising a cap for the other end of the filler tube.

17. The aircraft according to claim 12, further comprising a lid operatively engaging said maintenance hole of the cowl and capable of being positioned in an open position and a closed position with respect to said maintenance hole.

18. The aircraft according to claim 15, further comprising an oil level gauge having a grip.

19. The aircraft according to claim 18, further comprising a cap for the other end of the filler tube.

20. The aircraft according to claim 19, further comprising a lid operatively engaging said maintenance hole of the cowl and capable of being positioned in an open position and a closed position with respect to said maintenance hole.

21. The engine according to claim 4, wherein said slip on portion further includes at least one shoulder portion having a diameter smaller than the inner diameter of the service hole.

22. The engine according to claim 21, wherein said slip on portion includes a seal groove adjacent to said at least one shoulder portion.

23. The aircraft according to claim 12, wherein said hole cover includes a slip on portion operatively engaged with an inner diameter of the service hole.

24. The aircraft according to claim 23, wherein said slip on portion further includes at least one shoulder portion having a diameter smaller than the inner diameter of the service hole.

25. The aircraft according to claim 24, wherein said slip on portion includes a seal groove adjacent to said at least one shoulder portion.

* * * * *